United States Patent
Park et al.

(10) Patent No.: US 10,623,202 B1
(45) Date of Patent: Apr. 14, 2020

(54) SYSTEM AND METHOD OF CONTROLLING NETWORK TRAFFIC FOR A NETWORK WITH IN A DEVICE

(71) Applicant: GM Global Technology Operations LLC, Detroit, MI (US)

(72) Inventors: Taeju Park, Ann Arbor, MI (US); Soheil Samii, Royal Oak, MI (US); Prachi Joshi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 12 days.

(21) Appl. No.: 16/170,651

(22) Filed: Oct. 25, 2018

(51) Int. Cl.
*H04L 12/40* (2006.01)
*B60W 50/00* (2006.01)

(52) U.S. Cl.
CPC ... *H04L 12/40143* (2013.01); *B60W 50/0098* (2013.01); *B60W 2540/00* (2013.01); *B60W 2900/00* (2013.01); *H04L 2012/40273* (2013.01)

(58) Field of Classification Search
CPC .... H04L 12/40143; H04L 2012/40273; B60W 50/0098; B60W 2540/00; B60W 2900/00
See application file for complete search history.

(56) References Cited

U.S. PATENT DOCUMENTS

| | | | |
|---|---|---|---|
| 6,647,323 B1 * | 11/2003 | Robinson | H04L 12/40013 701/1 |
| 8,838,330 B2 * | 9/2014 | Richards | B60W 50/04 701/29.1 |
| 2014/0142801 A1 * | 5/2014 | Shah | H04L 43/065 701/32.7 |
| 2016/0381679 A1 * | 12/2016 | Ryu | H04B 1/3822 370/329 |
| 2017/0190337 A1 * | 7/2017 | Singh | B60W 50/14 |
| 2019/0079842 A1 * | 3/2019 | Chae | G06F 11/3013 |

OTHER PUBLICATIONS

Zhao, Pop, Zheng, Li; "Timing Analysis of AVB Traffic in TSN Networks using Network Calculus"; IEEE Real-Time and Embedded Technology and Applications Symposium; 2018; pp. 25-36.

* cited by examiner

*Primary Examiner* — Hashim S Bhatti
(74) *Attorney, Agent, or Firm* — Quinn IP Law

(57) ABSTRACT

A system and method of controlling network traffic for a network in a device that has a plurality of units, including one or more provider and recipient units. The recipient units are configured to send respective subscription requests for data originating from the provider units. A controller is programmed to enter an initial phase when at least one initial condition is met. A repeat phase is entered when a list of currently active subscription is received. In the repeat phase, the controller is configured to monitor the network for a respective timing checking request sent by the provider units. When the controller receives a timing checking request, the controller stores the request in the queue module as respective queue member. The controller is configured to perform a timing analysis test on a selected member of the queue module and control the device based partly on the timing analysis test.

17 Claims, 2 Drawing Sheets

SYSTEM AND METHOD OF CONTROLLING NETWORK TRAFFIC FOR A NETWORK WITH IN A DEVICE

INTRODUCTION

The present disclosure relates generally to a system and method of controlling network traffic for a network in a device. The ever-increasing complexity of devices, including but not limited to vehicles, has led to an increase in the number of signals being communicated between various sub-systems within a device. Accordingly, it is desirable to find efficient ways of managing and controlling network traffic within a device.

SUMMARY

Disclosed herein is a system and method of controlling network traffic for a network in a device. The device includes a plurality of units, including one or more provider units and one or more recipient units. The one or more recipient units are configured to send respective subscription requests for data originating from the one or more provider units, via the network. A controller is in communication with the plurality of units. The controller is also in communication with a queue module configured to store the respective subscription requests. In one example, the queue module is embedded in the controller. The respective subscription requests are identified by at least four factors, including a service identifier, a data recipient, a service criticality and a number of instances. The service identifier is a unique identifier for the data, function or service provided by the provider unit.

The controller includes a processor and tangible, non-transitory memory on which is recorded instructions. Execution of the instructions by the processor causes the controller to enter an initial phase when at least one initial condition is met. In the initial phase, the controller is configured to broadcast a request message to the plurality of units for a list of currently active subscriptions, via the network. A repeat phase is entered when the list of currently active subscription is received. In the repeat phase, the controller is configured to monitor the network for a respective timing checking request sent by the provider units. When the controller receives a timing checking request, the controller stores the request in the queue module as respective queue member.

The controller is configured to perform a timing analysis test on a selected member of the respective queue members. If the timing analysis is passed, the selected member is added to the list of currently active subscriptions and the controller is configured to re-enter the repeat phase. The controller is configured to reject the selected member if the timing analysis is not passed and re-enter the repeat phase.

The provider units may be configured to send respective subscription offers to the recipient units for data originating in the one or more provider units, via the network. In the repeat phase, the controller is configured monitor the network for a respective timing checking request sent by one of the provider units. When the controller receives a timing checking request, the controller stores the request in the queue module as a respective queue member. The respective timing checking request may be identified by the at least four factors, including the service identifier, the data recipient, the service criticality and the number of instances (required for transmission integrity).

Prior to performing the timing analysis test, the controller is configured to determine a quantity of the respective queue members. If the quantity is two or more, then the selected member is chosen based on a highest magnitude of the service criticality. If the service criticality of the respective queue members with the highest magnitude are equal, the controller may assign a secondary priority to the respective queue members; and choose the respective queue members with a greatest magnitude of the respective secondary priority number as the selected member. If the quantity is one, i.e., the queue module has a single member, the controller is configured to perform the timing analysis test on the single member.

In one example, the device includes at least one rear wheel, the provider units include a friction sensor and the recipient units include at least one rear toe controller configured to control the at least rear wheel. Here, the controller may include a selectively engageable module configured to adjust a toe angle for the at least one rear wheel based on a surface friction. In another example, the provider units include a vision-based imaging sensor, the recipient units include a brake controller and the controller includes a selectively engageable module configured to detect an object in a vicinity of the device and selectively engage the brake controller. In yet another example, the device includes at least one window, the provider units include a temperature sensor and the recipient units include at least one window controller configured to control a magnitude of opening the at least one window. Here, the controller may include a selectively engageable module configured to open the at least one window when a temperature in an interior of the device exceeds a threshold.

The above features and advantages and other features and advantages of the present disclosure are readily apparent from the following detailed description of the best modes for carrying out the disclosure when taken in connection with the accompanying drawings.

DETAILED DESCRIPTION

Figure 1:
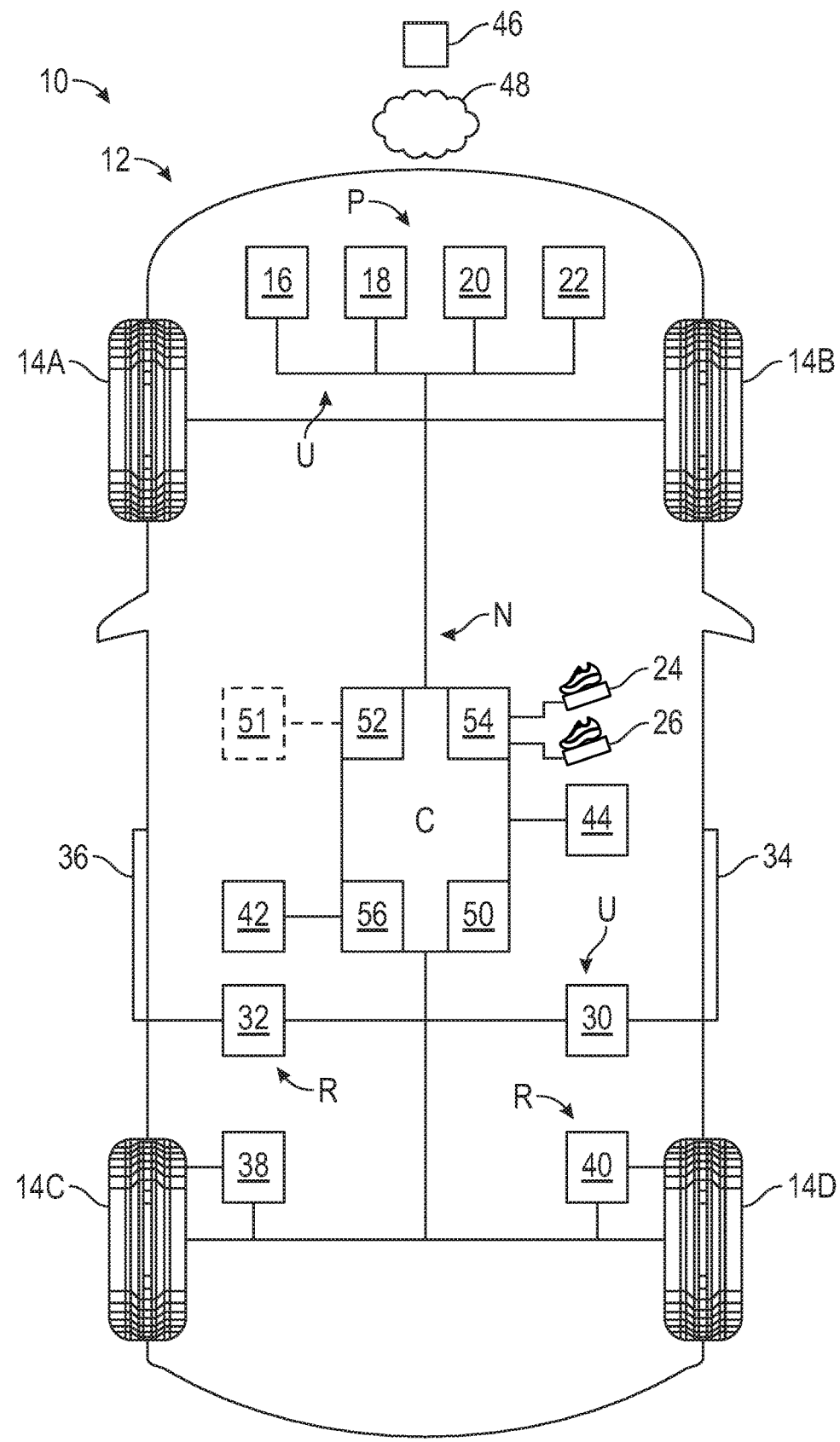
FIG. 1 is a schematic illustration of a system of controlling network traffic within a device having a plurality of units and a controller.

Referring to the drawings, wherein like reference numbers refer to like components, FIG. 1 schematically illustrates a system 10, which may be part of a device 12 having a plurality of units U. The plurality of units U include one or more provider units P and one or more recipient units R which are configured to communicate via a network N. It is to be understood that the number of the plurality of units U may be varied based on the application at hand. The network connection N may be wireless or include physical components or be a combination of both. The network connection N may be a bus, implemented in various ways, such as for example, a serial communication buses in the form of a local area network. The network connection N may include, but is not limited to a Controller Area Network (CAN), a Controller Area Network with Flexible Data Rate (CAN-FD), (Switched-) Ethernet, blue tooth, WIFI and other forms of data connection. While the network N may extend beyond the device 12, the system 10 is configured to control the network traffic within the device 12.

The device 12 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other transportation device. The device 12 may be a non-mobile platform, such as, but not limited to, a desktop computer, household appliance, medical device, home automation unit and industrial automation unit. The device 12 may take many different forms and include multiple and/or alternate components and facilities.

Referring to FIG. 1, the recipient units R are configured to send respective subscription requests for data originating from the provider units P, via the network N. The provider units P may be configured to send respective timing checking requests in response to the respective subscription requests. Additionally, the provider units P may be configured to send respective subscription offers to the recipient units R for data originating in the one or more provider units, via the network N. The term "subscription" refers to agreeing to have data delivered for a period of time. The respective subscription offers may be forwarded to more than one recipient unit R at the same time.

In the example illustrated in FIG. 1, the device 12 is a vehicle having a plurality of wheels, such as first front wheel 14A, second front wheel 14B, first rear wheel 14C and second rear wheel 14D. It is to be understood that the examples below are intended to be non-limiting. The provider units P may include a vision-based imaging sensor 16, a temperature sensor 18, a radar sensor 20 and a friction sensor 22. The recipient units R may include a brake controller 24, an accelerator controller 26, a first window controller 30 and a second window controller 32. The first window controller 30 and second window controller 32 are configured to physically change the magnitude of opening or closing of a first window 34 and a second window 36, respectively, of the device 12. The recipient units R may include a first toe controller 38 and a second toe controller 40 configured to physically change the toe angle for the first rear wheel 14C and the second rear wheel 14D, respectively. The recipient units R may include an infotainment system 42 configured to provide audio and visual entertainment to an operator of the device 12.

Referring to FIG. 1, the system 10 includes a controller C in communication (e.g., in electronic communication) with the plurality of units U. The controller C is also in communication with a queue module 50 configured to store the respective timing checking requests sent by the provider units P. In one example, the queue module 50 is embedded in the controller C. In another example, the queue module (see reference 51 in FIG. 1) may be in communication with the controller C, without being embedded in the controller C. The controller C includes at least one processor 52 and at least one memory 54 (or non-transitory, tangible computer readable storage medium) on which are recorded instructions for executing method 100 (described below with respect to FIG. 2) of controlling the device 12. The memory 54 can store controller-executable instruction sets, and the processor 52 can execute the controller-executable instruction sets stored in the memory 54.

The method 100 ensures that additional subscriptions do not cause any timing violation of currently active service subscriptions. Other methods of controlling network traffic include performing a worst-case scenario timing analysis, which is done offline. The disadvantage of worst-case scenario timing analysis is that the logic simulation requires a great deal of computational time and capacity. Additionally, the functionality of the circuit has to be known ahead of time as the timing verification process is fixed at the time the device is designed. A gap between the worst-case scenario and currently active network flow may be created due to significant change of the network flow's behavior at runtime, leading to an inefficient process.

The system 10 and method 100 provide the technical advantage that the currently active scenario is analyzed in real-time, instead of analyzing the worst-case scenario at the time of design. The controller C (and execution of the method 100) improves the functioning of the device 12 by accommodating significant changes in the network flow's behavior at runtime and increasing efficiency in computation. Additionally, it allows for after-market updates in the device 12.

The controller C may include at least one selectively engageable module 56 (see FIG. 1) that may be engaged on operator command. In one example, referring to FIG. 1, the selectively engageable module 56 may be configured to open the first window 34 and second window 36 when the temperature in the interior of the device 12 exceeds a threshold. The selectively engageable module 56 may be configured to close the first window 34 and second window 36 when precipitation is expected. When this selectively engageable module 56 is engaged, the first and second window controllers 30, 32 may request a subscription to the temperature sensor 18 (to get data on the current temperature) or a subscription to the radar sensor (for precipitation data).

In another example, referring to FIG. 1, the selectively engageable module 56 may be configured to detect objects in a vicinity of the device 12 and engage the brake controller 24 to avoid impact. When this selectively engageable module 56 is engaged, the brake controller 24 may request a subscription to the vision-based imaging sensor 16, which may include camera units positioned in the front, rear and sides of the device 12. In another example, the selectively engageable module 56 may be configured to adjust the toe angle for the first rear wheel 14C and the second rear wheel 14D based on the friction of the road surface. When this selectively engageable module 56 is engaged, the first toe controller 38 and second toe controller 40 may request a subscription to the friction sensor 22 for friction data.

Figure 2:
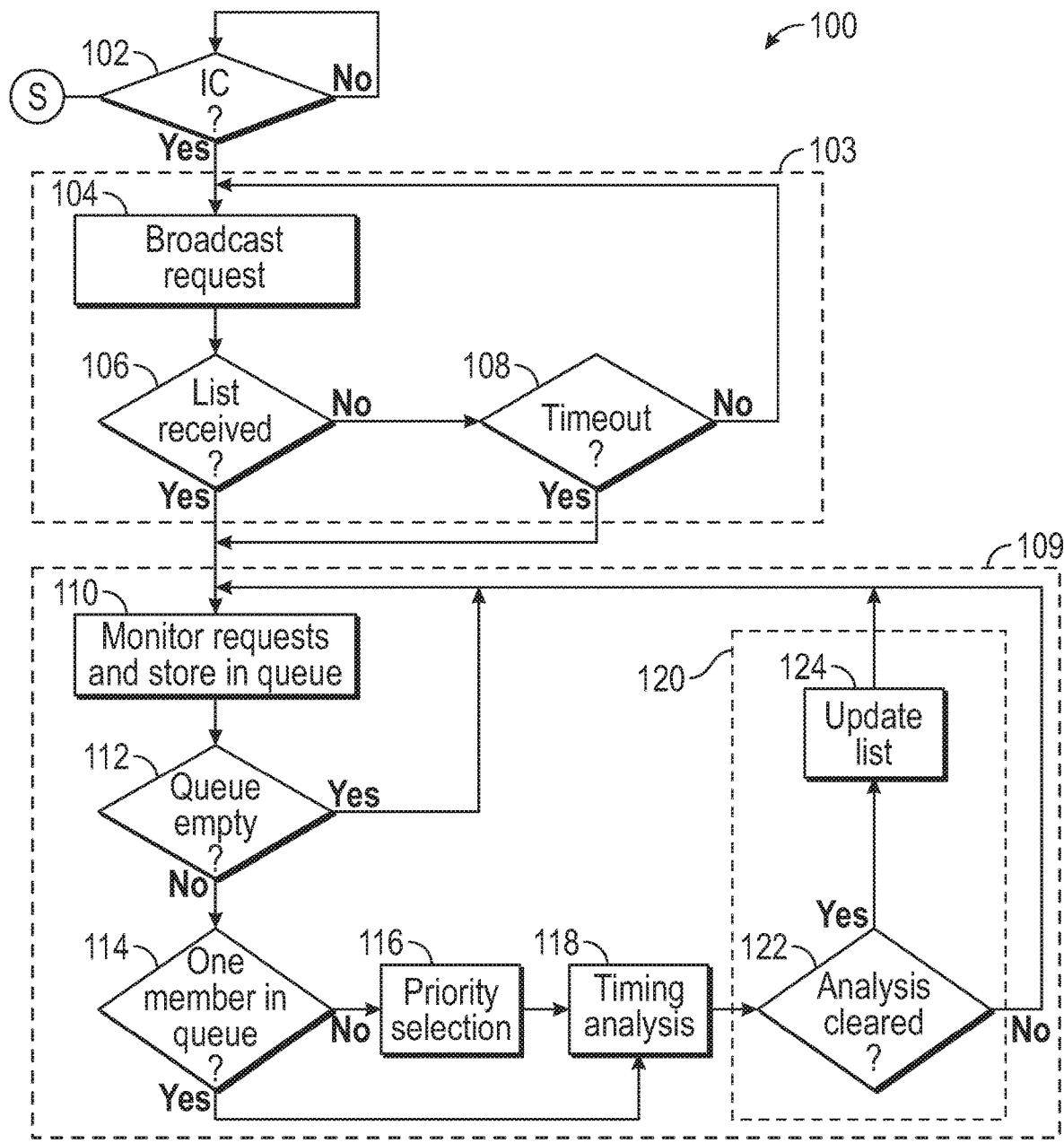
FIG. 2 is a schematic flow diagram for a method executable by the controller of FIG. 1.

Referring now to FIG. 2, a flowchart of the method 100 stored on and executable by the controller C of FIG. 1 is shown. Method 100 need not be applied in the specific order recited herein. Furthermore, it is to be understood that some steps may be eliminated. The controller C of FIG. 1 is specifically programmed to execute the steps of the method 100. Referring to FIG. 2, method 100 may begin with block 102, where the controller C is programmed or configured to determine if at least one initial condition ("IC" in FIG. 2) is met. This step may be omitted, as noted above, such that the method 100 is automatically engaged when the controller C is awake or the device 12 is activated. If the device 12 is a vehicle, the initial condition may include the ignition being on and the device 12 being in a particular transmission mode.

Referring to FIG. 2, if the initial condition is met, the method 100 enters an initial phase 103 and proceeds to block 104. In block 104, the controller C is configured to broadcast a request message to the plurality of units U for a list of currently active subscriptions, via the network N. In block 106 of FIG. 4, the controller C is configured to determine if the list of currently active subscriptions has been received. If the list has not been received, the method 100 proceeds to block 108, where the controller C is configured to determine if a system time-out has occurred, e.g., a predefined time period has elapsed. If the system time-out has not occurred, the method 100 loops back to block 106. If the system time-out has occurred, the method 100 proceeds to block 110. The predefined time period may be selected based on the application at hand and may depend on network processing times.

If the list has been received, the method 100 enters a repeat phase 109 and proceeds to block 110. In block 110, the controller C is configured to monitor the network N for respective timing checking requests from the provider units P. The respective timing checking request may be identified by the service identifier, the data recipient, the service criticality and the number of instances required for transmission integrity. The service identifier is a unique identifier for the data, function or service provided by the provider unit. The service criticality is encoded in the system and associated with each data or service provided by the provider unit P. The controller C may be configured to monitor the network N continuously or for a predefined time window. In one example, the predefined time window is between 1 millisecond and 10 milliseconds, inclusive. The queue module 50 is configured to store the respective timing checking requests as respective queue members.

From block 110, the method 100 proceeds to block 112 where the controller C is configured to determine if the queue module 50 is empty. If the queue module 50 is empty, the method 100 loops back to block 110. If the queue module 50 is not empty, the method 100 proceeds to block 114 where the quantity of the respective queue members is ascertained.

Per block 114, if the queue module 50 has a single member, the method 100 proceeds to block 118 where the controller C is configured to perform a timing analysis test on the single member. If the quantity of the respective queue members is at least two and the service criticality (numbers) are equal, then per block 116, the controller C is configured to perform a priority selection test. The priority selection test may include assigning a respective secondary priority number to the respective queue members, and selecting the respective queue members with a greatest magnitude of the respective secondary priority number as the selected member. The controller C may employ a selectively engageable module 56 to determine the secondary priority number.

By way of a non-limiting example, a scale of zero to a hundred may be selected for the respective secondary priority number, with zero being the least priority and hundred being the greatest priority. For example, the controller C may be programmed to assign a respective secondary priority number for subscription requests made by each of the receptor units R. In a non-limiting example, referring to FIG. 1, the brake controller 24, first rear toe controller 38, first window controller 30 and infotainment system 42 may be assigned the criticality numbers 90, 50, 30, and 20, respectively, thus giving the greatest priority to the brake controller 24 and the least priority to the infotainment system 42.

From block 116, the method 100 proceeds to block 118, where the controller C is configured to perform the timing analysis test on the selected member. The timing analysis test may include determining the effect on latency for each item in the currently active service subscriptions due to the potential additional load on the network N created by adding the selected member to the list. Latency may be measured as the time taken for information to get to its destination across the network N. The timing analysis test is passed if adding the selected member of the queue module 50 does not cause a timing violation with the currently active service subscriptions, in other words, the additional load on the network N allows the currently active subscriptions on the list to meet their latency deadlines. For example, the currently active service subscriptions may include an engine control message with a current latency of 4 milliseconds and a latency deadline (or maximum latency) of 7 milliseconds. If the additional load created by the selected member increases the latency to 8 milliseconds, the timing analysis test is not passed. If the additional load increases the latency to 6 milliseconds, the timing analysis test is cleared as the deadline of 7 milliseconds is met. The timing analysis test may be selected from a method or program available to those skilled in the art.

From block 118, the method 100 proceeds to block 120, where the controller C is configured to control the device 12 based in part on the results of timing analysis test. Block 120 includes sub-blocks 122 and 124. Per sub-block 122, the controller C is configured to determine if the timing analysis test was cleared or passed. If the timing analysis is passed, per block 124 of FIG. 2, the selected member is added to the list of currently active subscriptions and the controller C is configured to re-enter the repeat phase. The controller C is configured to reject the selected member if the timing analysis is not passed and re-enter the repeat phase 109. As noted above, the timing analysis test is not passed if adding the selected member causes a timing violation with at least one of the currently active subscriptions.

Referring to FIG. 1, controlling the device 12 (per block 120) may include sending a message regarding the outcome of the timing analysis test to an operator of the device 12 on a display console 44 (see FIG. 1). Referring to FIG. 1, controlling the device 12 (per block 120) may include sending a message regarding the outcome of the timing analysis test to a remote server 46 via a wireless connection 48. The remote server 46 may be accessible, for example, to a fleet manager where the device 12 is an autonomous vehicle. The remote server 46 may be accessible, for example, to a party interested in updating the predefined parameters in the controller C.

The controller C of FIG. 1 may be an integral portion of, or a separate module operatively connected to, other controllers of the device 12. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc.

Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of controlling network traffic for a network in a device, the system comprising:
    a plurality of units in the device, the plurality of units including one or more provider units and one or more recipient units;
    wherein the one or more recipient units are configured to send respective subscription requests for data originating in the one or more provider units, via the network, the respective subscription requests being identified by at least four factors, including a service identifier, a data recipient, a service criticality and a number of instances required for transmission integrity;
    a queue module configured to store the respective subscription requests;
    a controller in communication with the plurality of units and the queue module;
    wherein the controller includes a processor and tangible, non-transitory memory on which instructions are recorded, execution of the instructions by the processor causing the controller to:
        enter an initial phase when at least one initial condition is met;
        in the initial phase, broadcast a request message to the plurality of units for a list of currently active subscriptions, via the network;
        enter a repeat phase when the list of currently active subscriptions is received;
        in the repeat phase, monitor the network for a respective timing checking request sent by the one or more provider units, the respective timing checking request being identified by the service identifier, the data recipient, the service criticality and the number of instances;
        store the respective timing checking request in the queue module as respective queue members;
        perform a timing analysis test on a selected member of the respective queue members; and
        control the device based in part on the timing analysis test, including adding the selected member to the list of currently active subscriptions if the timing analysis test is passed and re-entering the repeat phase.

2. The system of claim 1 wherein the queue module is embedded in the controller.

3. The system of claim 1, wherein the predefined time window is between 1 and 10 milliseconds, inclusive.

4. The system of claim 1, wherein:
    the one or more provider units are configured to send respective subscription offers to the one or more recipient units for the data originating in the one or more provider units, via the network; and
    in the repeat phase, the controller is configured to monitor the network for the respective subscription offers for the predefined time window and store the respective subscription offers in the queue module as the respective queue members.

5. The system of claim 4, wherein:
    the respective subscription offers are identified by the service identifier, the data recipient, the service criticality and the number of instances.

6. The system of claim 4, wherein controlling the device includes:
    if the timing analysis test is not passed, rejecting the selected member and re-entering the repeat phase, via the controller.

7. The system of claim 6, wherein, prior to performing the timing analysis test, the controller is configured to:
    determine a quantity of the respective queue members in the queue module; and
    if the quantity is two or more, then chose the selected member based on a highest magnitude of the service criticality.

8. The system of claim 7, wherein the controller is configured to:
    if the service criticality of the respective queue members with the highest magnitude are equal, assign a secondary priority to the respective queue members; and
    choose the respective queue members with a greatest magnitude of the respective secondary priority number as the selected member.

9. The system of claim 1, wherein:
    the device includes at least one rear wheel;
    the one or more provider units include a friction sensor and the one or more recipient units include at least one rear toe controller configured to control the at least rear wheel; and
    the controller includes a selectively engageable module configured to adjust a toe angle for the at least one rear wheel based on a surface friction.

10. The system of claim 1, wherein:
    the one or more provider units include a vision-based imaging sensor and the one or more recipient units include a brake controller; and
    the controller includes a selectively engageable module configured to detect an object in a vicinity of the device and selectively engage the brake controller.

11. The system of claim 1, wherein:
    the device includes at least one window;
    the one or more provider units includes a temperature sensor and the one or more recipient units include at least one window controller configured to control a magnitude of opening the at least one window; and the controller includes a selectively engageable module configured to open the at least one window when a temperature in an interior of the device exceeds a threshold.

12. A method of controlling network traffic for a network in a device having a plurality of units and a controller, the controller having a processor and tangible, non-transitory memory on which instructions are recorded, the plurality of units including one or more provider units and one or more recipient units, the method comprising:
configuring the one or more recipient units to send respective subscription requests for data originating from the one or more provider units, via the network;
identifying the respective subscription requests by at least four factors, including a service identifier, a data recipient, a service criticality and a number of instances required for transmission integrity, via the controller;
configuring a queue module to store the respective subscription requests;
configuring the controller to be in communication with the plurality of units and the queue module, via the network;
entering an initial phase when at least one initial condition is met, via the controller;
in the initial phase, broadcasting a request message to the plurality of units for a list of currently active subscriptions, via the network;
entering a repeat phase when the list of currently active subscriptions is received;
in the repeat phase, monitoring the network for a respective timing checking request sent by the one or more provider units, the respective timing checking request being identified by the service identifier, the data recipient, the service criticality and the number of instances;
storing the respective timing checking request in the queue module as respective queue members;
performing a timing analysis test on a selected member of the respective queue members; and
controlling the device based in part on the timing analysis test, including adding the selected member to the list of currently active subscriptions if the timing analysis test is passed and re-entering the repeat phase.

13. The method of claim 12, further comprising:
prior to performing the timing analysis test, determining a quantity of the respective queue members, via the controller; and
if the quantity is two or more, then choosing one of the respective queue members as the selected member based on a highest magnitude of the service criticality, via the controller.

14. The method of claim 13, further comprising:
if the service criticality of the respective queue members with the highest magnitude are equal, assigning a secondary priority to the respective queue members; and
choosing the respective queue members with a greatest magnitude of the respective secondary priority number as the selected member, via the controller.

15. The method of claim 12, further comprising:
configuring the one or more provider units to send respective subscription offers to the one or more recipient units for the data originating in the one or more provider units, via the network; and
in the repeat phase, monitoring the network for the respective subscription offers for the predefined time window and storing the respective subscription offers in the queue module as the respective queue members, via the controller.

16. The method of claim 15, further comprising:
identifying the respective subscription offers by the service identifier, the data recipient, the service criticality and the number of instances.

17. The method of claim 15, wherein controlling the device includes:
if the timing analysis test is not passed, rejecting the selected member and re-entering the repeat phase, via the controller.

* * * * *

UNITED STATES PATENT AND TRADEMARK OFFICE
CERTIFICATE OF CORRECTION

PATENT NO. : 10,623,202 B1
APPLICATION NO. : 16/170651
DATED : April 14, 2020
INVENTOR(S) : Taeju Park et al.

Page 1 of 1

It is certified that error appears in the above-identified patent and that said Letters Patent is hereby corrected as shown below:

On the Title Page

Item (54) and In the Specification, Column 1, Line 3, In the TITLE "WITH IN" should be --WITHIN--.

Signed and Sealed this
Seventh Day of July, 2020

Andrei Iancu
*Director of the United States Patent and Trademark Office*